United States Patent [19]
Cobb et al.

[11] 3,912,929
[45] Oct. 14, 1975

[54] CELL-BY-CELL CONDITION DETECTING

[75] Inventors: Carolus M. Cobb; Martin Annis, both of Newton, Mass.

[73] Assignee: American Science & Engineering, Inc., Cambridge, Mass.

[22] Filed: Dec. 10, 1973

[21] Appl. No.: 423,573

[52] U.S. Cl. ............... 250/303; 250/304; 250/364
[51] Int. Cl. .............................................. G21h 5/02
[58] Field of Search .......... 250/303, 304, 365, 364, 250/458, 461

[56] References Cited
UNITED STATES PATENTS

| | | | |
|---|---|---|---|
| 3,413,464 | 11/1968 | Kamentsky | 250/304 |
| 3,673,410 | 6/1972 | Waite et al. | 250/303 |
| 3,801,783 | 4/1974 | Caiola | 250/304 X |

Primary Examiner—Archie R. Borchelt
Attorney, Agent, or Firm—Charles Hieken; Jerry Cohen

[57] ABSTRACT

A patient population of cells in a tissue sample is treated with a solution containing radioactive gallium to allow the gallium to be absorbed by the cells. The cells are examined to determine amounts of radioactive material absorbed by the cells by passage of the solution through a cell counter and scintillation counter. Outputs of the counters are correlated to produce signals indicative of the gallium absorption of each cell. The amount of gallium absorption by a cell is a function of malignancy. The signals are processed to produce a histogram of the cell population for a patient. The histogram shows the number of cells of each radioactivity level plotted against the radioactivity level per cell. The apparatus and process are also usable in connection with other cytological measurements.

19 Claims, 3 Drawing Figures

CELL-BY-CELL CONDITION DETECTING

BACKGROUND OF THE INVENTION

The present invention relates in general to detecting cell conditions and more particularly concerns a novel technique for detecting the probability of malignancy through inducing malignant exfoliated cells to absorb gallium in-vitro and subsequently measuring the gallium content of the cells using radioactivity detection methods.

The invention is especially useful in connection with expediting the clinical screening done through Papanicolau (PAP hereinafter) tests. A PAP test involves smearing scraping from the cervix upon a slide. The slide is stained with two or three dyes, then a cytotechnician observes the slide under a microscope, looking for cells meeting the criteria of malignancy. In general these are:

1. The ratio of nucleus to cytoplasm is altered.
2. When the nuclear chromatin is not condensed, it shows a "blotched" pattern; often with irregular cleared areas.
3. There is variation in nuclear size (anisonucleosis) and staining intensity of chromatin (anisochromia) among the abnormal cells.
4. The nuclear memberane is irregular and shows abrupt variation in thickness.
5. The nuclear chromatin shows sharp points and angles.
6. The nuclei show abnormal nucleoli-more than the normal number or increase in size.

If the slide looks suspicious, the technician calls in a cytopathologist.

One slide examination typically takes a technician 15 minutes for a negative specimen. Typically, there are only about 55 positives in 10,000 specimens. The present manual testing procedures involve much time of skilled technicians.

For a discussion of attempts to automate PAP smear analysis, reference is made to SUMMARY OF STATE-OF-THE-ART WORK SHOP ON PAPANICOLAU SMEAR ANALYSIS edited by Ramsey-Klee in April, 1970, available from the U.S. National Technical Information Service, Washington, D.C.

Accordingly, it is an important object of this invention to provide automated cell by cell detection of various cell conditions.

It is a further object of this invention to provide a new diagnostic tool, i.e., the detailed histogram of gallium pickup by cells, for the early detection of cancer and the choice of optimum measures for cure, whether surgical, chemical or radiological.

It is a further object of this invention to provide a new diagnostic tool for following the course of the disease and to evaluate the efficacy of different methods of treatment.

It is a further object of the invention to provide high speed of processing consistent with the preceding object.

It is a further object of the invention to provide optimum conditions for the measurement of the uptake of radioistopes by individual cells and to reduce the effects of extraneous non-cellular particulate matter to acceptable levels.

It is a further object of the invention to provide nondestructive testing and post-test retention capability consistent with one or more of the preceding objects.

It is a further object of the invention to provide raw data, in addition to data reduction, read out capability for statistical verification and checking purposes consistent with one or more of the preceding objects.

It is a further object of the invention to provide automated techniques for detecting malignant cells suitable for use in systems for automatically examining sample tissue or other sources of cell sample populations and rejecting for manual examination negative specimens while indicating the small number that are or may be positive and which warrant detailed smear analysis.

It is a further object of the invention to achieve one or more of the preceding objects with technique and apparatus that may be utilized by relatively unskilled personnel.

It is a further object of the invention to provide a new test for malignancy that may be performed more rapidly at less expense than a complete PAP test.

It is a further object of the invention to generate data and data reduction outputs automatically consistent with one or more of the preceding objects.

SUMMARY OF THE INVENTION

According to the invention, a specimen that may contain normal and malignant exfoliated cells is mixed with a solution of a gallium compound, such as gallium citrate or another gallium salt to cause the malignant cells to absorb gallium. Preferably, this mixing occurs sufficiently long so that the cells are suspended in the solution and so that gallium absorption by those cells having absorption capacity is substantially complete, typically for 20 minutes to 24 hours. The solution composition is previously adjusted with respect to acidity (pH) and the presence of neutral salts to favor specific selective uptake of gallium by malignant, premalignant, or inflamed cells. The gallium level of specific aliquots of the solution-suspension may then be detected by radioactive detection techniques as hereinafter described. Such detection is done without taking the cells out of the suspension.

According to one aspect of the invention, radioactive gallium-67 is used as the source of gallium. Alternatively, other radioactive tracers may be linked to a nonradioactive gallium isotope for sorption by malignant cells. In either case, the suspension of the cells which have absorbed the gallium is manipulated to provide a count of total number of cells in the specimen which are tested for radioactivity and the statistical incidence of radioactivity in the cells.

An approximately known quantity of cells is put into suspension in the solution. This suspension is then injected at a controlled rate from a primary reservoir into a particulate-free stream of solution which carries the cells through the flow apparatus. The particulate-free main stream is purified in situ by passage through an ultrafiltration membrane before injection of the cell suspension occurs. The main stream containing the injected cells is pumped at a flow rate adequate to maintain laminar flow.

The object of injecting the cell suspension into the particulate-free carrier stream is two-fold. First, the injection process makes it possible to use a suspension of cells in the primary reservoir which is far more concentrated than the suspension of cells which is required for optimum counting in the instrument. Because the suspension of cells in the primary reservoir is concentrated, the noncellular particulate matter, which is unavoidably acquired during the initial processing of the cells, is kept to a small fraction of the cellular concentration. Secondly, by injecting the cells into a clean stream at a controlled rate, it is possible to fix the concentration of cells in the main stream at a level which produces optimum counting behavior in the nuclear counting equipment. Since biological specimens often contain widely varying cellular concentrations, a number of sequential operation comparison measurements of cellular concentrations, dilutions and remeasurements of cellular concentrations after dilution would be necessary to insure an optimum cellular concentration if a controlled rate injection system were not used.

The optimum cellular concentration in the main flow stream of the instrument is defined as the concentration which causes the maximum number of isolated cells to pass through the nuclear counter in a fixed time period. This optimum cellular concentration can be calculated as follows:

The number of cells ($N_o$) which traverse the counter in the time T is:

$$N_o = \frac{vT}{a} \qquad (1)$$

where $a$ = the average distance between cells and $v$ is fluid velocity. The simultaneous probability ($P_i$) that there is no cell before or after a cell in the counter for a distance $d$ on each side is:

$$P_i = \epsilon^{-2d/a} \qquad (2)$$

where $d$ = the distance the cells travel within the nuclear counter. The number of "isolated" cells ($N_i$) which traverse the counter in the time T is:

$$N_i = \frac{vT}{a}\epsilon^{-2d/a} \qquad (3)$$

To maximize $N_i$, one differentiates with respect to $a$, setting the derivative equal to zero. This gives:

$$a = 2d$$

Then optimum $$\frac{N_i}{N_o} = \frac{1}{\epsilon} = \frac{1}{2.718} = 0.37 \qquad (5)$$

Hence, the optimum counting rate for isolated single cells is 37% of the total number of cells passing through the system and the required concentration of cells is such that the average spacing between cells in the fluid stream is twice the length of the counting chamber.

After injection into the main fluid stream, the diluted cellular suspension passes through a cell counter means and a scintillation counting means in the course of running through the flow system. The cell counting means produces an electrical signal as each cell passes through it. This signal is used for two purposes. First, the rate at which such signals occur is used to adjust the rate at which injection of cells into the main stream occurs in order to insure an optimum concentration. Second, this signal is transmitted to signal delaying and triggering means which delays the signal by enough time for the corresponding cell to enter the scintillation counting means. The scintillation counting means is then triggered to begin counting for a period which is precisely the time that the cell is within a scintillator component of the scintillation counting means (typically 0.1 seconds).

Laminar flow in the fluid stream is preferable to ensure that the spacing of the cells in the liquid remains constant during the passage from the cell counting means. Laminar flow is established when Reynolds numbers are less than 2100. The Reynolds number for a typical suspension flowing through the apparatus may be estimated from the equation:

$$R_e = \frac{\rho c D}{\mu} \qquad (6)$$

where
- $c$ is the mean velocity of the stream (60 cm/sec.)
- $d$ is the diameter of the tubing (0.03 cm)
- $\rho$ is the density of the fluid (0.85) (ml) )
- $\mu$ is the dynamic viscosity of the fluid (1.75 centiPoise)

Thus, $$R_e = \frac{0.85 \times 60 \times 0.03}{1.75 \times 0.01} = 87.5 \qquad (7)$$

Hence, for all reasonable changes in channel diameter, solution viscosity and stream velosity, the Reynolds number of 2100 will not be reached and the flow will be laminar.

At the end of this counting period, the scintillation counting means automatically transmits the radioactive decay count of the last counted cell to data recording means and resets itself to zero in readiness for the next cell trigger signal.

The delayed cell counting signal of the cell counting means and the scintillation count of the corresponding cell are both transmitted simultaneously to first data processing means which produce hard copy recording of raw data and convert the signal to a form usable in further data processing, such as conversion to magnetic tape. The converted signal is fed to second data processing means programmed to generate derived results from the raw data which may comprise a histogram from statistical representation of number of cells as a function of radioactive counts per cell. The second data processing means may also present a rearrangement of the raw data for purposes of statistical analyses and checking and also to designate beginning and end points for each patient cell population in order to allow continuous flow monitoring by the apparatus of a sequence of patient cell populations.

A high number of radioactive counts corresponds to a high uptake of radioactive gallium, which is a characteristic of the malignant cells whether taken as part of in-vivo or in-vitro specimens.

Other cytological studies can be made automatically consistent with complete cell-by-cell review through the present invention.

For example, mixed lymphocyte cultures (such as would be obtained through in-vitro or in-vivo samplings to test the effectiveness of organ transplants) can be tagged with a radioactive tracer, e.g. carbon-14, which is selectively picked up by protein antibodies formed in response to incompatibility of the mixed components. In other words, a higher pickup of carbon 14 indicates a bad "take" of the transplant.

The present invention is not limited to use with samples separated from the patient, but can also be used in an extracorporeal circulation loop of any body fluid.

Numerous other features, objects and advantages of the invention will become apparent from the following specification when read in connection with the accompanying drawing in which

DETAILED DESCRIPTION OF PREFERRED EMBODIMENTS

Figure 1:
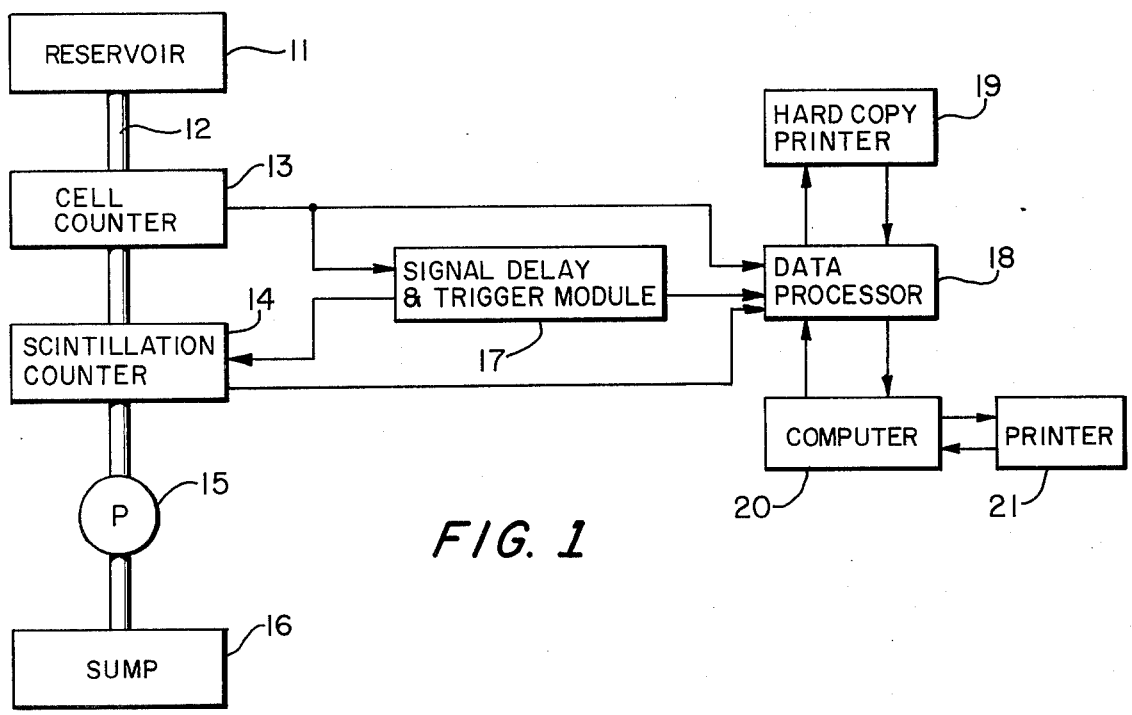
FIG. 1 is a block diagram of an automated gallium uptake measurement system according to the invention.

Referring now to the drawing and more particularly FIG. 1 thereof, there is shown a block diagram of a system according to the invention. A reservoir 11 feeds a pipe 12 which defines a flow path passing through a cell counter 13, a scintillation counter 14, a pump 15 and draining the solution into a sump 16. A signal delay and trigger module 17 provides starting signals to the scintillation counter 14 and to a data processor 18 which feeds a hard copy printer 19 and a special purpose computer 20. The computer has a peripheral output device 21 for printing histograms and other data derivations as well as raw data arrangements.

The pump 15 and reservoir 11 may be combined through the use of a syringe type infusion/withdrawal pump. Such a pump comprises a gas tight, inert, non-shedding piston in a cylinder and a gear drive for the piston to assure constant displacement of the piston. This affords constant metered flow of sample suspension from the cylinder into the passage 12. Tetrafluoroethylene, as a piston or piston sealing ring, is preferred over glass as a material of construction in the pump because of greater resistance to spalling or shedding in such usage.

The particle counter 13 may be a Coulter counter or HIAC silicon diode particle counter or other conventional photoelectric particle counting apparatus. It is preset to provide cell counts segregated into cell size groups transmitting, for example, numbers of cells in each of the size ranges 5 to 11 microns ($\mu$), 11–20$\mu$, 20–50$\mu$, 50–150$\mu$ in separate output channels. The pulse analysis readout of cell counting data from the photomultiplier is accomplished by peak detection means and analog to digital conversion means in counting means 13 (not indicated separately but which may be separate electric circuit modules). The cell sizes detected are based on diameters of roughly equivalent spheres.

Typical passage dimensions for the portion of passage 12 between counters 13 and 14 are 0.012 in diameter and 5 inches long to establish a transit time of cells of 0.2 second to 1 second from counter 13 to counter 14. The diameter of the portion of passage 12 upstream of counter 13 is larger than 0.012 inches and has a back pressure established by the 0.012 inch diameter passage portion.

The scintillation counter comprises a photoemissive crystal, such as activated sodium iodide, cesium iodide, cesium bromide, zinc sulfide, anthracene, stilbene, napthalene, bisphenol, terphenol, or other suitable material. The crystal has a port therein forming a portion of the passage 12. The sample suspension, containing cells with absorbed radioactive gallium therein, emits Gamma radiation which strikes the port's inner surface. The crystal port surface generates photons in response to incident radiation, which are intercepted by a first photocathode of a photomultiplier tube arranged in viewing relation to the port. The photomultiplier includes ten or more secondary electron emitting plates (dynodes) and a final plate which receives a highly amplified signal corresponding to the amount of incident radiation impinging on the port surface of the crystal within the field of view of the photocathode. The current output of the photomultiplier tube is fed to an amplifier and a counter where the time-integrated pulse current is translated into a signal reflecting the number of pulses received over a selected time period datum.

Preferably, two scintillation counters 14 are provided with overlapping, series flow arrayed, crystal ports. A first one of the two scintillation counters has a reduced solid angle field of view of its photocathode, or increased shielding, compared to a second one of the scintillation counters to provide a coarse scale using said first one and a fine scale using the second one of said scintillation counters. The coarse scale acts as backup to the fine scale to avoid saturation of scintillation counter logic.

The computer 20 comprises a real time clock which is utilized by the signal delay and trigger device 17. The computer's memory stores the radioactive count and cell passage (through counter 13) event together in its memory. The recording of the count and event are done during computer interrupts and computer output is produced between interrupts for real time data readout and data reduction.

The computer may be programmed to adjust the system to select radioactivity counting times which are statistically consistent with maximum visibility to the scintillation counter's photocathode consistent with minimizing simultaneous multi-cell observations. For instance in a flow system affording one cell per second transit time through state of the art scintillation counters, 37% of cells are alone in front of the detector. But chances are 85% for 0.2 seconds and 61% for 0.5 seconds of clear count time. Shortening the time of observation by the photocathode from 1.0 seconds to 0.2 seconds increases the statistical error by a factor of only 2.2.

In a typical process utilizing the above apparatus for malignancy detecting, a specimen in reservoir 11 comprises epithelial scrapings or washing, such as from the vaginal cervix or oral cavity which may be fresh or may have been previously fixed by immersion in an alcohol solution comprising 70 to 100% by volume of methyl or ethyl alcohol. These scrapings are placed into suspension in a gallium solution 13 containing gallium citrate or other gallium salt. If the solution is an isotonic aqueous solution with a pH approximately equal to 7.0, gallium citrate or a similar gallium complex is used to prevent the precipitation of gallium at this pH. If the solution is composed of ethyl or methyl alcohol, 70 to 95% by volume and water, the gallium salt used is preferably the trichloride thereof.

When using alcohol solutions preferential uptake of gallium by malignant, premalignant or inflamed cells can be enhanced over uptake by normal cells by using a solution acidity corresponding to pH 2.0 to pH 4.5 and a neutral salt to lower the average ionic activity coefficients of the suspension as a whole. Such salts should contain cations with ionic radii at least 5% greater than the ionic radius of the tervalent gallium ion as determined by crystallographic measurements. Concentrations of such neutral salts ranging from 0.05 to 0.15 moles/liter are suitable.

Solution concentrations should be adjusted to give a level of activity of 0.1 millicuries per milliliter (mci/ml) to 10 mci/ml in a total solution volume of 1 ml to 15 ml. Preferably enough scrapings should be placed in the solution so that the cell population of the sample is of the order of $10^3$ to $10^4$ or more.

After an equilibration period of typically 20 minutes to 24 hours, the cells are separated from the bulk of solution 13 either by centrifuging at 1000 g's for 10 minutes and discarding the bulk of the supernatent liquid to leave a cellular suspension approximately 0.2 ml in volume, or by filtering off the bulk of the solution using a Millipore or similar filter which will pass cells and debris 5 microns or smaller in diameter. When the Millipore filter is used, it is permissible to enlarge the volume of the solution from 3 to 10 ml to 100 to 150 ml in order to combine an initial washing with the first separation of the bulk of the radioactive solution. Filtration is carried out until the solution volume is reduced to 0.1 ml to 10 ml.

The cellular matter is then washed. If centrifugation is used to separate the cells, the washing procedure consists of adding to the approximately 0.2 ml residue of cells, solution which is free of gallium to bring the volume of the solution from 0.2 ml to 2 to 10 ml. The solution used for washing may be a solution such as an aqueous methyl or ethyl alcohol solution, 70 to 95% by volume alcohol. The enlarged solution is stirred vigorously for a few minutes to cause the cellular matter to be fully exposed to the wash solution and then centrifuged at 1000 g's for 10 minutes. By this process, the cellular matter is found to collect in a compact suspension about 0.2 ml in volume from which the bulk of the wash solution may be discarded.

If filtration through a Millipore filter is used to separate the cells, the washing procedure consists of adding sufficient solution free of radioactivity to the first residue from the Millipore filtration process to bring the volume of the solution to 5 to 150 ml. The enlarged solution is then stirred vigorously for several minutes and filtered through a Millipore filter which passes material 5 microns or smaller in diameter until the volume of the solution is reduced to one half to 15 milliliters. As in the centrifugation procedure, the washing liquid may consist of solution, such as an aqueous alcoholic solution containing 70 to 95% methyl or ethyl alcohol by volume.

The washing procedure is continued until the radioactive count in the filtered wash liquid is close to background. This customarily takes five to eight washings by centrifugation and five to eight washings by the Millipore filtration method. The washing procedure removes the gallium not absorbed by the cells.

After the cells have been washed, they are resuspended in an alcohol solution containing 70 to 95% alcohol by volume. For cells washed by centrifugation, this may be accomplished by taking the approximately 0.2 ml suspension of cells after the final centrifugation and diluting with 95 to 100% by volume alcohol until the final alcoholic concentration is 70 to 95%. For cells washed by the Millipore filtration technique, the cells are in an alcohol suspension if alcohol washing solutions have been used. If isotonic aqueous washing solutions have been used, the reduced volume after the last filtration is increased by the addition of 95 to 100% by volume alcohol until a final concentration of 70 to 95% by volume alcohol exists and the solution volume is reduced to a convenient size (1 to 10 ml) by filtration through a Millipore filter which passes material 5 microns or less in diameter.

After washing and suspension in alcohol, an aliquot of solution is measured which contains 1000 to 50,000 cells in suspension therein. The technique for obtaining such an aliquot is well known in the art and comprises a determination of the number concentration of cells in the specimen suspension using either a Coulter counter or a microscopic counting technique. Alternatively, an aliquot may be counted into the system through the injection device.

The suspension is placed in reservoir 11 of FIG. 1 and constantly agitated by a stirrer (not shown) to prevent settling of the cells and to insure uniform mixing of the cells within the solution. Fluid piping sizes, solution concentrations and rate flows are adjusted so that, preferably, one cell per 0.01 to 1 second passes through the counter 13. The signal delay and trigger module 17 delays triggering of the scintillation counter 14 until the counted cell which initiated a signal to the module 17 has reached the scintillation counter. This is typically a delay of 0.05 to 5 seconds. When signal delay and trigger module 17 triggers scintillation counter 14, module 17 also sends a triggering signal to the data processor 18 which generates an internal start signal to place itself in a ready condition for receiving a count signal from scintillation counter 14 and transferring the count signal to printer 19 and computer 20.

Printer 19 provides a hard copy of human readable printout and/or tape or other machine readable record of raw data in the form of a cell-by-cell radioactive count.

Figure 2:
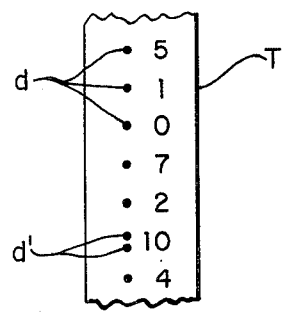
FIG. 2 is a plan view of a raw data tape showing a dot indication of each cell measured and an adjacent scintillation count for that cell.

FIG. 2 shows a sample of such raw data on a tape T with a series of dots d indicating cell counts and a scintillation decay count number next to each such dot. In some instances two dots appear together, as indicated at $d'$, where two cells are simultaneously in the scintillation during decay counting.

Figure 3:
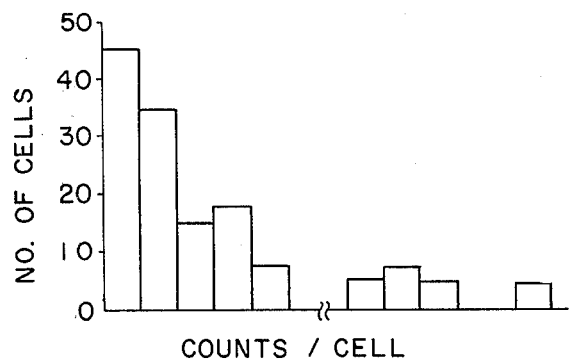
FIG. 3 is a sample of a histogram plot of gallium uptake typically provided in accordance with apparatus and techniques according to the invention.

Computer 20 produces a data-reduced summary printout in human readable and/or machine readable form. A typical format of such summary is the histogram plot of FIG. 3. The y-axis of the plot is number of cells and the x-axis is radioactive counts per cell. The histogram comprises block form plots of numbers of cells which exhibited radioactivity within predetermined count ranges. This data arrangement has greater clinical significance than average or median count data because malignancy is established upon the occurrence of a single malignant cell manifested by exceptionally high radioactivity.

Specific electrical logical and control circuits, interconnections thereof and hard or soft programming thereof to carry out the above described system operation are not, per se, part of this invention, are well known in the art, and are not described in detail herein to avoid obscuring the principles of the invention.

There has been described a novel cell condition detecting technique and apparatus which affords high speed, low cost, automatic cell analysis and 100% inspection and can yield real time data reduction together with raw data printouts for statistical verification. It is apparent that those skilled in the art may now make numerous uses and modifications of and departures from the specific embodiments described herein without departing from the inventive concepts. Accordingly, the invention is to be construed as embracing each and every novel feature and novel combination of features present in or possessed by the apparatus and techniques disclosed herein and limited solely by the scope and spirit of the appended claims.

What is claimed is:

1. A method of cell-by-cell cytological examination comprising,
    forming a test suspension by suspending a cell population of a type having a variable radioactivity level as an indication of cell condition in a liquid,
    flowing the test suspension under conditions producing a flow series of suspended cells,
    providing a cell signal representative of cells flowing past a given point,
    measuring the radioactivity of a portion of the test suspension comprising essentially one cell for a given period of time,
    and recording the radioactivity during each given period of time to provide an indication of the radioactivity of each cell flowing past said given point.

2. A method of cell-by-cell cytological examination in accordance with claim 1 wherein a radioactive form of gallium is dissolved in said liquid, and further comprising,
    treating the cell population sample in said liquid to enhance gallium uptake by the cells.

3. A method of cell-by-cell cytological examination in accordance with claim 2 and further comprising,
    treating the solution to increase ionic activity of the test suspension.

4. A method of cell-by-cell cytological examination in accordance with claim 3 wherein said step of treating comprises adjusting the pH of the solution to a range of 2.0 to 4.5 and adding neutral salt thereto to increase ionic activity of the solution,
    then equilibrating the solution for gallium absorption by cells,
    then separating out a highly concentrated cell suspension from the solution to isolate cells as substantially the sole radioactive sources in the liquid,
    and diluting the concentrated cell suspension to form said test suspension.

5. A method of cell-by-cell cytological examination accordance with claim 4 wherein said dilution is provided by a particulate-free, laminarly flowing carrier stream.

6. A method of cell-by-cell cytological examination in accordance with claim 2 wherein the radioactive gallium is gallium-67 isotope.

7. A method of cell-by-cell cytological examination in accordance with claim 2 wherein the gallium is tagged by combination of a radioactive element therewith.

8. A method of cell-by-cell cytological examination in accordance with claim 1 and further comprising,
    enabling a radioactivity counter after a delay interval corresponding to the transit time of a cell from a first location where cells are counter to a second location where radioactivity of each cell is counted.

9. Apparatus for cell-by-cell cytological examination comprising,
    means for flowing past a given point a series of suspended cells that may be characterized by radioactivity representative of cell condition,
    counting means at said given point for providing a cell signal representative of a cell flowing past said given point,
    means defining a radioactivity counting region for accepting said series of suspended cells after they pass said given point.
    scintillation counting means adjacent said radioactivity counting region for providing a radioactivity signal representative of the radioactivity in the latter region,
    and means responsive to said cell signal and said radioactivity signal for providing a signal representing the radioactivity of a cell represented by a particular cell signal.

10. Apparatus in accordance with claim 9 and further comprising,
    electrical data processing means connected to said scintillation counting means for producing a machine readable record of scintillation counts,
    said data processing means being operatively connected to said signal triggering means to initiate said record production and to correlate cell counting and decay counting in preselected timed relation to said counting steps.

11. Apparatus in accordance with claim 10 further comprising,
    means for producing in histogram form a statistically correlated output of different measured decay count and corresponding numbers of counted cells which had each of the respective decay counts.

12. A method of cell-by-cell cytological examination in accordance with claim 1 wherein said step of measuring the radioactivity includes the steps of,
    flowing said test suspension through a radioactivity counting region adjacent to a scintillation counter spaced from said given point,
    and receiving count signals from said scintillation counter at a predetermined time that is related to the time each cell flows past said given point represented by said cell signal while the cell represented by the latter cell signal is in said radioactivity counting region to provide a signal representative of the radioactivity of the latter cell.

13. A method of cell-by-cell cytological examination in accordance with claim 12 wherein said cells flow past said given point at a rate of one cell per 0.01 to 1 second.

14. A method of cell-by-cell cytological examination in accordance with claim 12 wherein said time interval is within the range of substantially 0.2 to 1 second.

15. A method of cell-by-cell cytological examination in accordance with claim 12 and further including the step of maintaining laminar flow of said test suspension from at least said test point to at least said radioactivity counting region.

16. A method of cell-by-cell cytological examination in accordance with claim 12 and further including the step of establishing the average spacing between cells flowing past said given point as substantially twice the length of said radioactivity counting region.

17. A method of cell-by-cell cytological examination in accordance with claim 12 and further including the step of controlling the introduction of cells into the test suspension flowing past said given point in response to said cell signal to maintain a predetermined cell concentration in said test suspension flowing past said given point.

18. A method of cell-by-cell cytological examination in accordance with claim 12 and further including the steps of classifying said cells into cells of different sizes, and combining said count signals and the cell signal to provide a sequence of said count signals each identified with a cell of a particular size classification.

19. Apparatus for cell-by-cell cytological examination in accordance with claim 9 and further comprising, cell size classifying means in association with said counting means for providing a plurality of said cell signals each representative of a cell of a particular size classification flowing past said given point.

* * * * *

UNITED STATES PATENT OFFICE
CERTIFICATE OF CORRECTION

PATENT NO. : 3,912,929
DATED : October 14, 1975
INVENTOR(S) : Carolus M. Cobb et al.

It is certified that error appears in the above-identified patent and that said Letters Patent are hereby corrected as shown below:

Column 10, line 7, "counter" should read -- counted --.

Signed and Sealed this ninth Day of March 1976

[SEAL]

Attest:

RUTH C. MASON
Attesting Officer

C. MARSHALL DANN
Commissioner of Patents and Trademarks